United States Patent [19]

Campbell et al.

[11] 3,848,114
[45] Nov. 12, 1974

[54] CONTROL SYSTEM FOR PROVIDING A SPIRAL FLIGHT PATH TO A RADIO BEACON

[75] Inventors: Curtis M. Campbell, Phoenix; Ronald J. Miller, Glendale, both of Ariz.

[73] Assignee: Sperry Rand Corporation, New York, N.Y.

[22] Filed: Jan. 12, 1972

[21] Appl. No.: 217,617

[52] U.S. Cl. ...... 235/150.26, 235/150.22, 244/77 B, 343/107, 235/150.1
[51] Int. Cl. .............................................. G06g 7/78
[58] Field of Search..... 235/150.22, 150.26, 150.27, 235/150.272; 244/77 A, 77 B; 343/107, 108 R

[56] References Cited
UNITED STATES PATENTS

| | | | |
|---|---|---|---|
| 3,177,348 | 4/1965 | Daniloff | 244/77B X |
| 3,361,391 | 1/1968 | Medlinski | 244/77 B |
| 3,355,733 | 11/1967 | Mitchell et al. | 235/150.22 X |
| 3,573,827 | 4/1971 | Botton et al. | 343/108 R |
| 3,099,007 | 7/1963 | Kittrell | 343/107 |
| 3,030,621 | 4/1962 | McCoy et al. | 244/77 B X |

Primary Examiner—Eugene G. Botz
Assistant Examiner—Jerry Smith
Attorney, Agent, or Firm—Howard P. Terry, Thomas P. Scott

[57] ABSTRACT

A flight control device which enables an aircraft to fly a converging curved trajectory in approaching a radio transmitter. The device includes a receiver responsive to the radiated signal from the transmitter which provides a signal proportional to the bearing of the aircraft to the radio transmitter. The device also includes means for providing a bias signal proportional to a desired bearing between the aircraft and the transmitter. These signals are combined with the output signal provided by a conventional direction sensor such as a directional gyroscope to produce a heading reference signal which is coupled into a heading command system in the aircraft and guides the aircraft along a converging curved flight path in approaching the radio transmitter.

7 Claims, 18 Drawing Figures

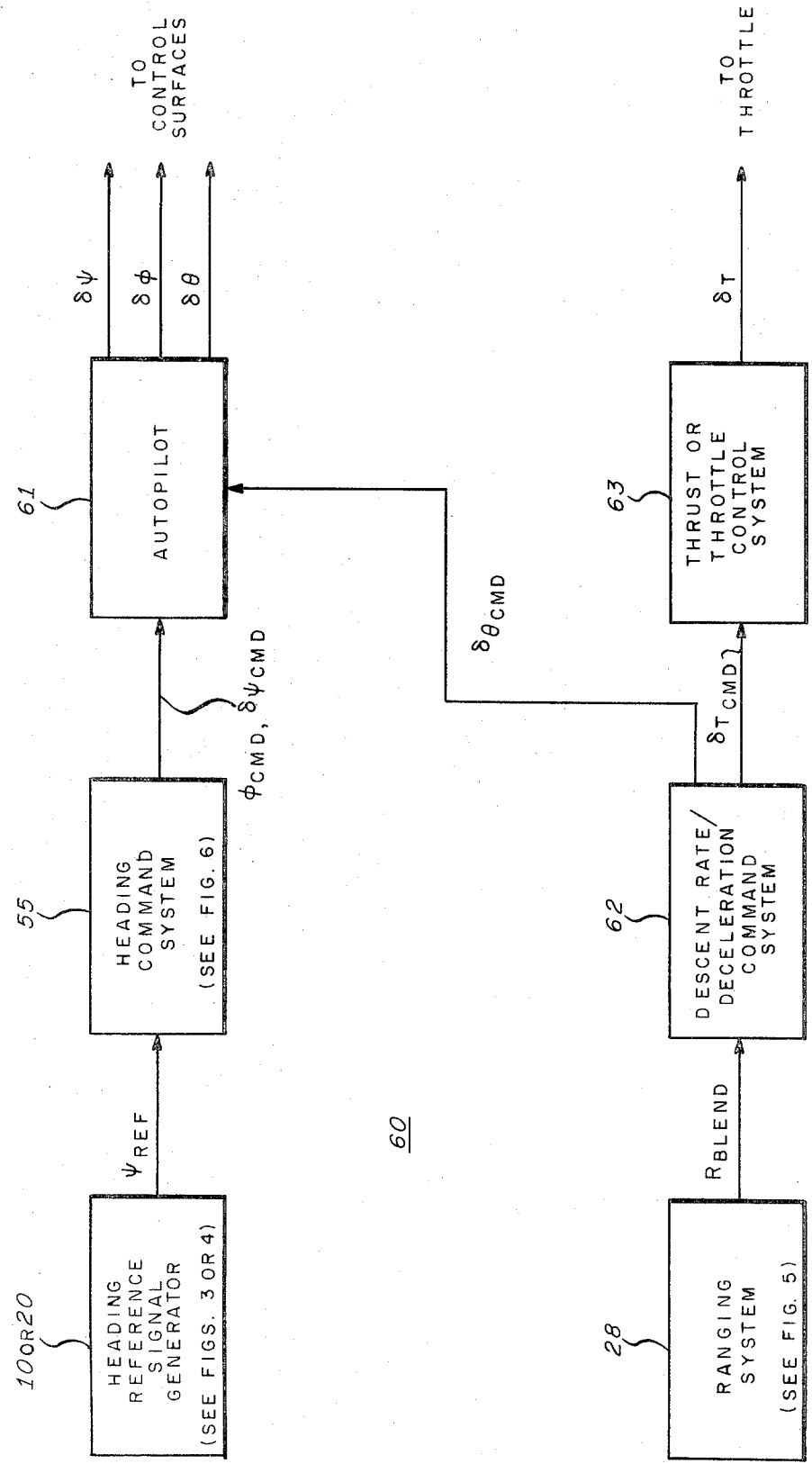

NO WIND

EAST WIND

NORTH WIND

WEST WIND

SOUTH WIND

CONTROL SYSTEM FOR PROVIDING A SPIRAL FLIGHT PATH TO A RADIO BEACON

BACKGROUND OF THE INVENTION

1. Field of the Invention

The subject invention pertains to the field of airborne flight control devices and particularly to those types of devices which enable an automatic approach to an omnidirectional radio beacon without first overflying the beacon.

2. Description of the Prior Art

In the prior art systems an automatic approach to an omnidirectional radio beacon is produced either by complex ranging systems or by systems which require overflight of the point of origin of the beacon in order to initially locate its position. After having overflown the beacon position, these systems include either a doppler navigation technique or an inertial navigation technique to guide the aircraft to the position of the beacon.

When one or more overflights of the beacon are required to accurately locate the precise position of the radio beacon, the operational efficiency of the aircraft is decreased by these time consuming maneuvers. Further, in a hostile environment these maneuvers increase the vulnerability of the aircraft to enemy action. Both doppler and inertial navigation type devices are relatively expensive and include a plurality of components to compute the necessary approach parameters in developing control signals in accordance with the range between the aircraft and the radio beacon. The subject invention provides an economical type system which computes a converging curved trajectory for the aircraft to approach an omnidirectional radio beacon thereby providing control of the aircraft in a single successful approach pattern to the radio beacon whereby the disadvantage in prior art systems that required the aircraft to overfly the beacon position is obviated. In accordance with the present invention, a measure of range is continuously computed, thereby alleviating the requirement of separate apparatus for directly measuring range especially in those cases where such apparatus is not available or is economically impossible. This system is particularly applicable to vertical take-off and landing (VTOL) aircraft including helicopters.

SUMMARY OF THE INVENTOIN

The subject invention is a control system for guiding an aircraft along a predetermined curved flight path; for example a spiral flight path which converges at an omnidirectional radio beacon and which includes means for maintaining the relative heading angle between the aircraft velocity vector and the range vector at a constant value. A first algebraic summation means provides an output signal equal to the difference between the actual bearing angle as determined in an ADF receiver and a constant value bias signal proportional to the desired relative heading angle. The difference signal is combined in a second algebraic summation network with the actual heading signal and simultaneously coupled through an integrating circuit which produces a "lead" term that is combined in a third algebraic summation circuit with the output of the second algebraic summation circuit to produce a heading reference signal that very accurately tracks the heading desired to maintain a constant relative heading angle.

Also incorporated in the subject invention is multiplier means which combines a vectoral component of the desired relative heading angle with a signal proportional to the aircraft velocity. The resultant output signal is combined in a divider circuit with a signal proportional to the rate of change of the bearing angle with respect to the radio beacon thereby producing an output signal proportional to the instantaneous value of range between the position of the radio beacon and the aircraft. A second vectoral component of the desired relative heading angle is combined with the aircraft velocity in a second multiplier circuit and subsequently modified in a constant K multiplier circuit to provide an output signal proportional to K times the rate of change of the range vector. This signal is then combined in an algebraic summation circuit with the signal proportional to range to produce an output signal which is coupled through a complimentary filter which provides a smoothened signal proportional to the instantaneous value of range without any lag in it. In order to provide control of the aircraft in the vertical plane the signal proportional to the instantaneous value of the range may be coupled into a descent rate control system or deceleration control system or both while the heading reference signal is coupled through a basic heading control system to provide command signals through a conventional autopilot system that guides the aircraft in a spiral trajectory to the radio beacon.

BRIEF DESCRIPTION OF THE DRAWINGS

FIG. 8 is a functional block diagram of an aircraft control system incorporating the subject invention;

DESCRIPTION OF THE PREFERRED EMBODIMENT

Figure 1:
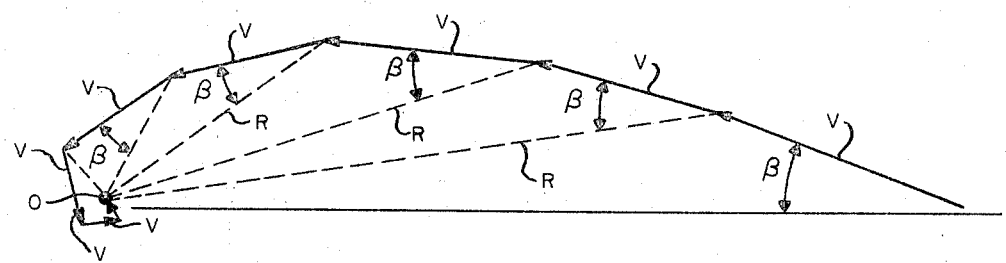
FIG. 1 is a diagram of a straight line approximation of a logarithmic curve of a spiral flight path in a horizontal plane.

The projection of a spiral path on to a horizontal plane is defined as a logarithmic curve in which the angle between the radius vector and the tangent line to the curve is constant for every point in the locus of the curve. This horizontal projection is shown in FIG. 1 in which the vectors V represent a straight line approximation of a logarithmic curve. The radial vectors R represent the radial distance between the termination point O of the logarithmic curve and points on the locus of the logarithmic curve at which the displacement angle $\beta$ between each radial vector R and each tangent vector V is constant.

Figure 2:
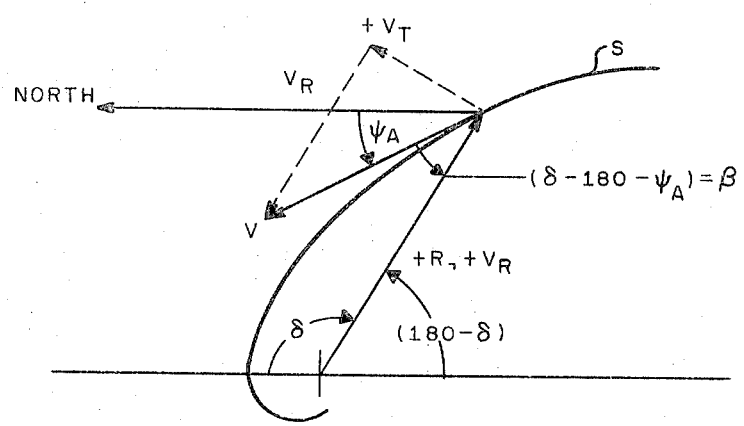
FIG. 2 illustrates the vectors and angular displacements necessary to determine the spiral flight path in a horizontal plane.

An aircraft flying a spiral path will produce a projection on to a horizontal surface as shown graphically in FIG. 2. The velocity vector V of the aircraft along a projected path S has a heading angle $\psi_A$ with respect to a vector pointing due north. The velocity vector V is comprised of two components, $V_R$ and $V_T$. The component $V_R$ is defined as the rate of change of the radial vector R which is equivalent to the range. The radial vector R is angularly displaced with respect to a line parallel to the direction to the vector pointing due north by an angle designated $\delta$. The second component $V_T$ of the velocity vector V is defined as the product of the range R and the rate of change of the angle $\delta$ and designated $\dot{\delta}$. The angle $\beta$ between the velocity vector V and the radial vector R is defined in terms of $\psi_A$ and the supplementary angle of $\delta$ as: $\delta - 180 - \psi_A = \beta$.

Since $\beta$ must be maintained constant in order to provide the projected logarithmic curve S, it is necessary that $\psi - \psi_A$ equal a constant.

The angle $\psi_A$ in an aircraft is the heading angle and is provided as an output signal from a heading reference unit such as a directional gyroscope. The subscript A in the $\psi$ signal $\psi_A$ refers to the actual heading with respect to due north and the angle $\beta$ refers to the actual angular displacement of the aircraft with respect to the radial vector. In order to have the aircraft guided along a spiral path it is necessary to generate a heading reference $\psi_{REF}$ which is a function of the desired relative heading angle $\beta_{DES}$.

Figure 3:
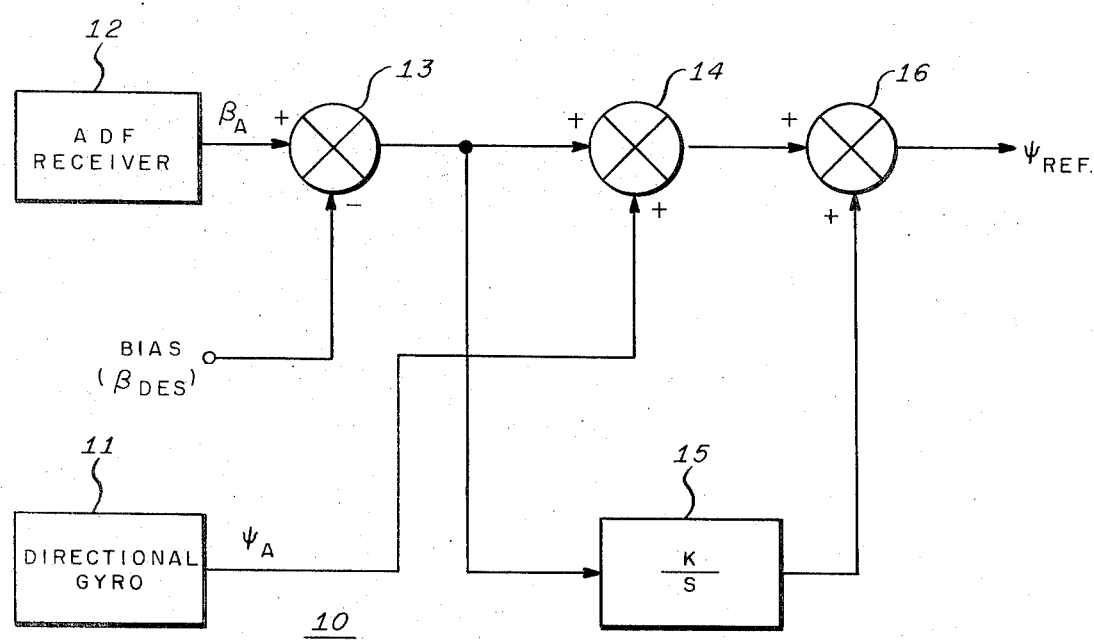
FIG. 3 is a functional block diagram of a heading reference system including an automatic direction finding receiver that generates a heading reference command for providing a spiral flight path.

FIG. 3 is a functional block diagram of a control circuit 10 which generates a heading reference $\psi_{REF}$ that is a function of the actual heading $\psi_A$ as provided by a directional gyroscope 11, the actual angular displacement $\beta_A$ as provided by an ADF receiver 12 and a constant value bias signal proportional to the desired relative heading angle $\beta_{DES}$ between the velocity vector V and the radial vector R.

The ADF receiver 12 produces an output signal, $\beta_A$, that is applied to the positive input terminal of an algebraic summation network 13 which has a constant value bias signal, $\beta_{DES}$, applied to a negative input terminal. The output signal, $\beta_A - \beta_{DES}$, produced by the first algebraic summation circuit 13 is applied to a positive input terminal on a second algebraic summation network 14. The output signal $\psi_A$ provided by the directional gyroscope 11 is applied to a positive input terminal on the second algebraic summation network 14 which produces a signal equivalent to $\beta_A - \beta_{DES} + \psi_A$ which is then applied to the positive input of the summation network 16. The $\beta_A - \beta_{DES}$ signal is also applied to an integration circuit 15 which provides an output that is the product of a constant and the integral of the applied signal.

The output signal produced by the integration circuit 15, K/S $(\beta_A - \beta_{DES})$ is applied to a positive input terminal on the third algebraic summation circuit 16 which produces the heading reference $\psi_{REF}$ that is used to command the spiral path of the aircraft. The integral path comprised of the integrating circuit 15 is necessary to maintain the system heading error at zero in the presence of the ever changing desired heading, $\psi_{DES}$. This integral path produces a "lead" term in the heading reference signal $\psi_{REF}$ so that the actual heading $\psi_A$ very accurately tracks the desired heading $\psi_{DES}$.

The signals $\psi_A$, $\beta_A$ and $\beta_{DES}$ may be analog voltages, in which case the algebraic summation circuits 13, 14 and 16 are analog synchro type devices and the integrator network is an analog circuit. Alternatively, the signals $\psi_A$, $\beta_A$ and $\beta_{DES}$ may be coupled through analog-to-digital converters to provide signals in digital form in which case the algebraic summation circuits 13, 14 and 16 and the integrator circuit 15 may be computerized sub-routines or equivalent digital circuits.

Figure 4:
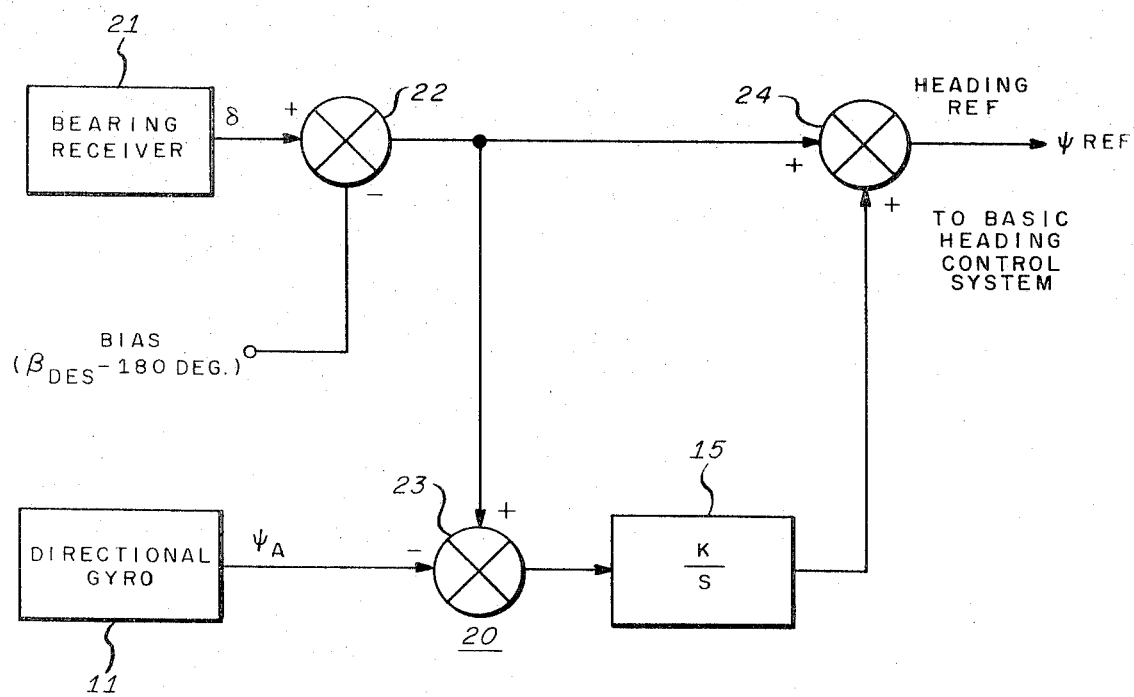
FIG. 4 is a functional block diagram of a heading system including a TACAN or VOR Bearing receiver which generates a heading reference command for providing a spiral flight path.

FIG. 4 is a functional block diagram of a control circuit 20 which generates a heading reference $\psi_{REF}$ that is a function of the actual heading $\psi_A$ as provided by a directional gyroscope 11, the relative bearing output signal $\delta$ as provided by an absolute bearing receiver such as a TACAN or VOR Bearing receiver 21 and a constant value bias signal proportional to the difference between the desired relative heading angle $\beta_{DES}$ and 180°.

In this embodiment the TACAN or VOR Bearing receiver 21 provides an output signal $\delta$ which is proportional to the outbound bearing from the radiating station to the aircraft. This bearing signal, $\delta$, is applied to a positive terminal on a first algebraic summation circuit 22 while the constant value bias signal $\delta_{DES} - 180°$ is applied to a negative input on the circuit 22.

The output signal, $\delta - \beta_{DES} + 180°$, produced by the first algebraic summation circuit 22 is applied to the positive input terminals on a second algebraic summation circuit 23 and a third algebraic summation circuit 24. The output signal $\psi_A$ provided by the directional gyroscope 11 is applied to a negative input terminal on the second algebraic summation circuit 23 which produces a signal equivalent to $\delta - \beta_{DES} + 180° - \psi_A$. This signal is applied to an integration circuit 15 which provides an output that is the product of a constant and the integral of the applied signal.

The output signal produced by the integration circuit 15, K/S $(\delta + 180 - \beta_{DES} - \psi_A)$ is applied to a positive input terminal on the third algebraic summation circuit 24 while the signal $\delta + 180 - \beta_{DES}$ is applied to a second positive input on the third algebraic summation circuit 24 which produces a heading reference signal $\psi_{REF}$ that is coupled to the basic heading control system as indicated by the leader in FIG. 4. The integral path comprised of the integrating circuit 15 performs an identical function to the integral path comprised of the integrating circuit 15 shown in FIG. 3 and described above.

Figure 5:
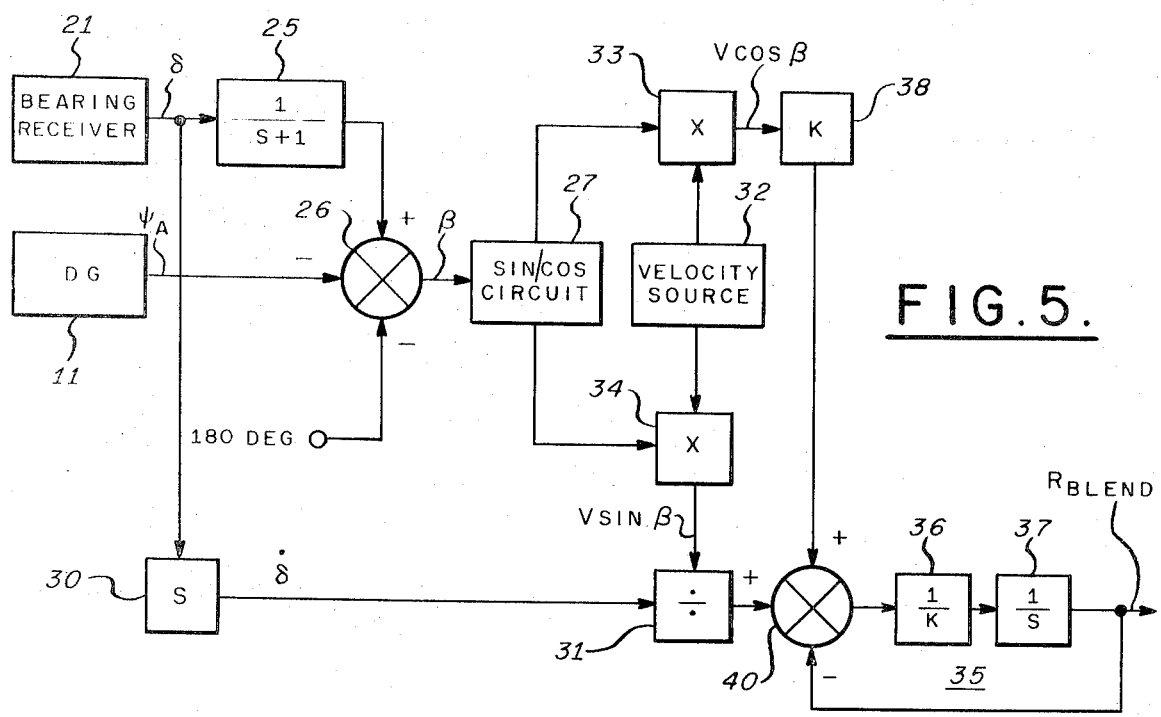
FIG. 5 is a functional block diagram of a ranging system for generating a filtered range signal used in providing a spiral flight path.

In order to fly a spiral path it is desirable to incorporate a descent rate deceleration control system. Although deceleration control may be performed conventionally by either an open loop technique or a closed loop technique, it is preferred that a closed loop technique be utilized in conjunction with the described invention. In the closed loop technique the deceleration rate is controlled as a function of the instantaneous value of the range between the source of the radio beacon and the aircraft. FIG. 5 shows a functional block diagram of a circuit for producing a filtered signal proportional to the instantaneous value of the range from the beacon source to the aircraft.

The receiver 21 provides an output signal $\delta$ which is proportional to the outbound bearing from the radiating station to the aircraft. This bearing signal is applied to a long time constant smoothing filter 25 represented by $1/S+1$. The filtered bearing signal is applied to a first positive input on a first albegraic summation circuit 26 while a heading angle signal, $\psi_A$, produced by the directional gyroscope 11 is applied to a first negative input terminal on the algebraic summation circuit 26 and a bias signal equivalent to 180° is applied to a second negative terminal. The algebraic summation circuit 26 produces an output signal, $\beta$, which is coupled into a sine/cosine circuit 27 that produces a first output equivalent to the sine $\beta$ and a second output equivalent to the cosine $\beta$. In an analog embodiment of the invention, the sine/cosine circuit 27 may be comprised of resolvers or equivalent circuit means while in a digital embodiment these functions may be performed by a programmed sub-routine or equivalent digital circuit elements.

The bearing signal $\delta$ is also coupled into a deriver or rate taking circuit 30 which provides a signal, $\dot{\delta}$, that is equivalent to the rate of change of the bearing angle $\delta$. This signal is applied to a first input terminal on a divider circuit 31. A velocity source 32 provides identical output signals, V, in accordance with the velocity of the aircraft as provided by any one of many types of aircraft velocity measuring instruments.

Figure 5A:
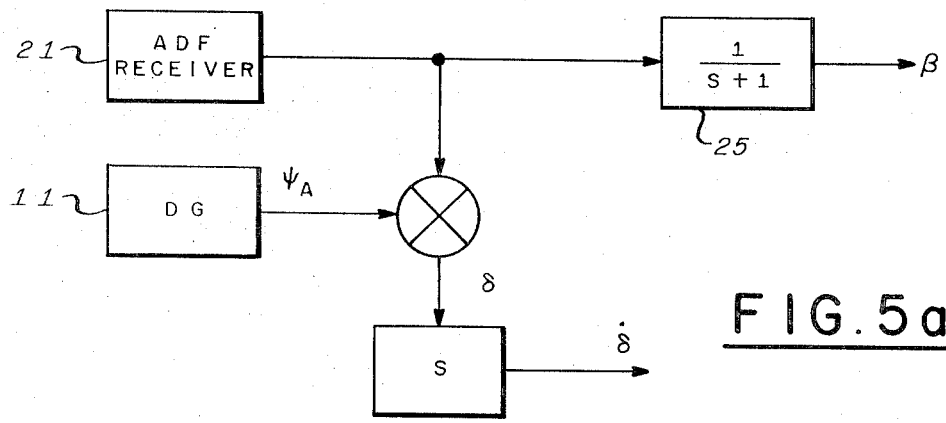
FIG. 5A is a block diagram of a modification of FIG. 5.

FIG. 5A shows an alternate method of producing the signals $\delta$ and $\beta$ when the receiver is a relative bearing or ADF receiver. The signal $\delta$ is derived from the summation of the ADF receiver 21 output and the D.G. 11 output.

The first velocity signal, V, is applied to a first input on a multiplier circuit 33 while the cosine $\beta$ signal is applied to a second input terminal and the multiplier circuit 33 produces an output signal, V cosine $\beta$, which is equivalent to the product of the velocity and the cosine of the radial displacement angle, $\beta$.

Concurrently the other velocity signal, V, from the velocity source 32 is applied to a first input terminal on a second multiplier circuit 34 while the sine $\beta$ signal is applied to a second input terminal and the multiplier circuit 34 produces an output signal V since $\beta$ which is the product of the velocity and the sine of the radial displacement angle, $\beta$. The signal, V sine $\beta$, is applied to a second input terminal on the divider circuit 31 which provides an output signal, R, equivalent to the range between the source of the radio beacon and the aircraft. This can be seen by reference to FIG. 2 in which the vector V is comprised of the components $V_R$ and $V_T$. The vector component $V_T = V$ sine $\beta$ which $= R\dot{\delta}$ and the vector component $V_R = -V$ cosine $\beta$ which $= \dot{R}$. The range, $R = V$ sine $\beta/\dot{\delta}$ which is the signal provided at the output of the divider circuit 31.

The range output signal, R, provided by the divider circuit 31 tends to be extremely noisy. Therefore, in order to reduce the noise content in this signal a complementary filter 35 comprised of a gain circuit 36, 1/K, and an integrator circuit 37, 1/S, together with a feedback path has a suitable time constant K, for example about 10 sec. However, if the only input to the 10 second complementary filters were the range signal R, the resultant range signal would have a 10 second lag in it. However, if a signal comparable to $10\dot{R}$ were combined with the signal R and applied to the complementary filter 35, then an output signal $R_{blend}$ would be produced which is smoothed in the 10 second complementary filter 35 but without any lag in it.

Mathematically this is shown as follows: The signal V cosine $\beta$ produced by the first multiplier 32 is equal to $\dot{R}$ as shown above. This signal is applied to a multiply by 10 circuit 38 to provide an output signal $10\dot{R}$ which is applied to a first positive terminal on an algebraic summation circuit 40. The output signal R from the divider circuit 31 is applied to a second positive input terminal on the algebraic summation circuit 40. Therefore, $10\dot{R} + R$ are the inputs to the algebraic summation circuit 40. However, $\dot{R}$ is equivalent to the derivative of the range vector R which may be expressed in terms of the Laplace operator S as, S times R. Hence, the inputs to the algebraic summation circuit may be rewritten as $10 SR + R$.

The complementary filter 35 has a transfer function represented by $1/10 S + 1$ that provides a feedback signal to a negative terminal on the algebraic summation circuit 40 so that the resultant output from the complementary filter 35 is $R_{blend} = (10 S + 1) R/(10 S + 1) = R$.

It will be noted that the resultant range signal, R, is a range signal which has been smoothed in a 10 second filter but does not have a 10 second lag in it. This range signal, $R_{blend}$, is coupled into an appropriate descent rate deceleration control system as the instantaneous value of range required to guide the aircraft along a spiral trajectory.

Figure 6:
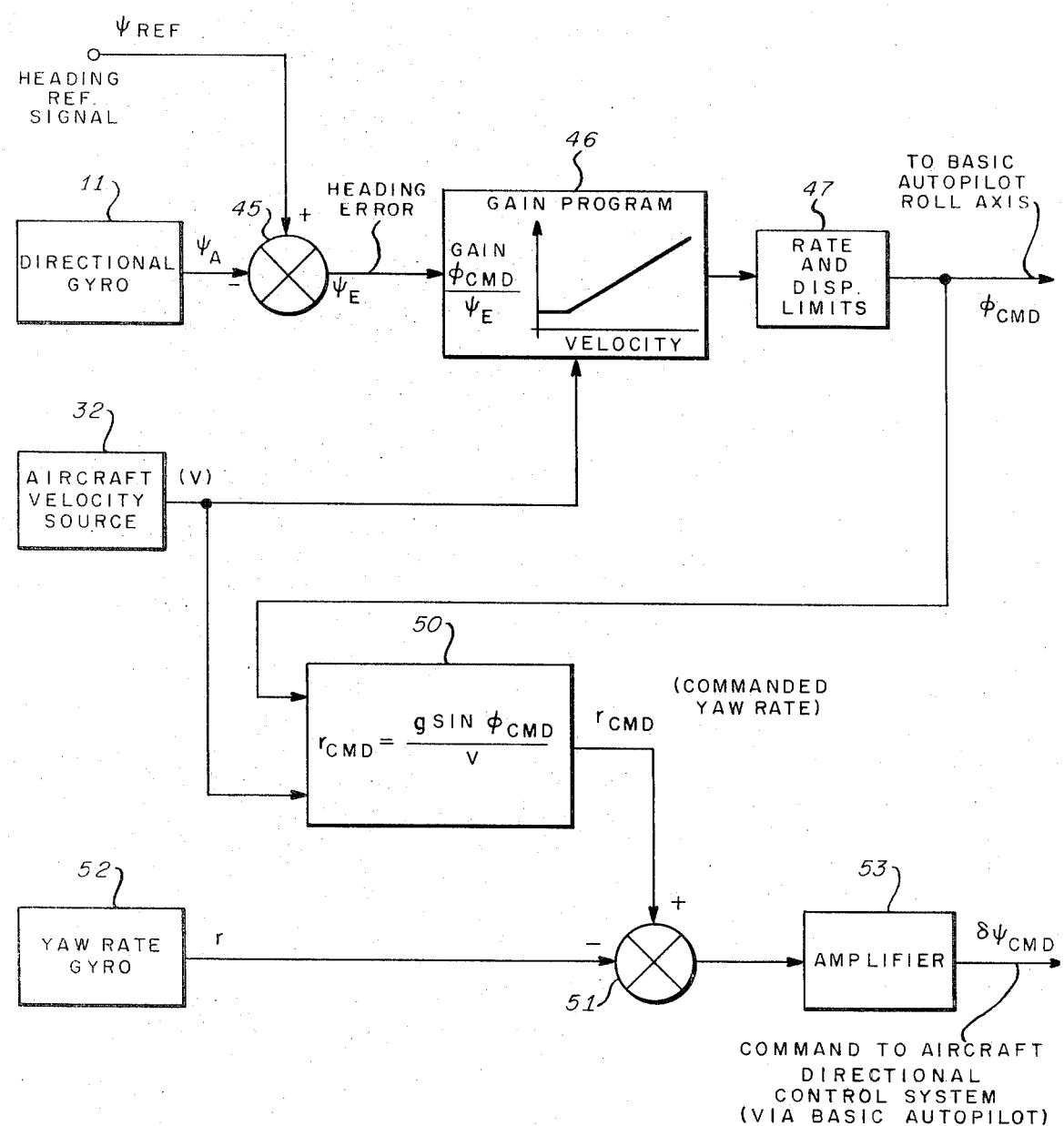
FIG. 6 is a functional block diagram of a basic heading command system.

A basic heading control system for use in an aircraft is shown in the functional block diagram of FIG. 6. The heading reference signal provided by the control circuit shown in FIG. 3 or FIG. 4 is applied as an input to a first positive terminal on a first algebraic summation circuit 45 and the actual heading $\psi_A$ from the directional gyroscope 11 is applied to a negative input terminal on the summation circuit 45 which produces a heading error signal $\psi_E$. The heading error signal $\psi_E$ is used to generate a corrective bank angle command signal $\phi_{CMD}$ to the roll axis of a basic autopilot system as indicated by the leader in FIG. 6. Optimum performance is obtained by programming the bank angle command signal $\phi_{CMD}$ as a function of the aircraft velocity by coupling a velocity signal, V, from a velocity source such as the velocity source 32 shown in FIG. 5. The velocity signal in FIG. 6 is applied to a gain program circuit 46 together with the heading error signal $\psi_E$ to provide an output in accordance with a typical gain versus velocity characteristic shown illustrated at 46 in FIG. 6. In addition, the bank angle command signal $100_{CMD}$ is limited both in displacement and rate of change by the rate and displacement limit circuits 47 to maintain the bank angle, $\phi$, at a value which is within safe limits and provides for pilot comfort.

When a dynamically varying heading reference $\psi_{REF}$ is being commanded such as in the spiral maneuver, a turn coordination function is included to insure that the path (ground track) performance which results from such a system is accurate. The implementation of this function is performed by computing a commanded yaw rate $r_{CMD}$ which is derived from the commanded bank angle $\phi_{CMD}$ and the aircraft velocity V. This feature is represented in FIG. 6 by the yaw rate command circuit 50 which has the bank angle command signal $\phi_{CMD}$ and the aircraft velocity signal V applied at its input terminals. The resultant commanded yaw rate signal $r_{CMD}$ is expressed as:

$$r_{CMD} = g \text{ sine } \phi_{CMD}/V$$

Figure 7:
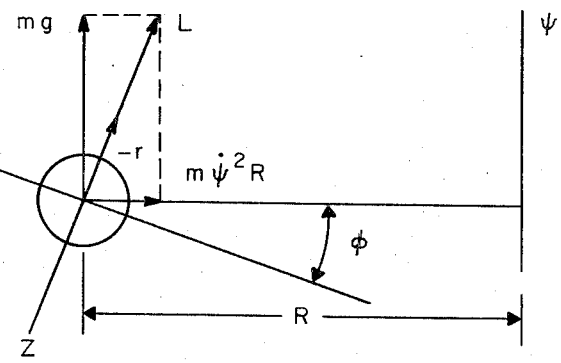
FIG. 7 is a vector diagram for determining a commanded yaw rate.

The derivation of this function may be understood by referring to FIG. 7 in which L represents the lift force vector and is specified positive in the upward direction and the weight of the craft is represented by the vector mg and the angle $\phi$ is the angle between the lift vector L and the vertical component of the lift vector $L_{mg}$ then $$L_{mg} = L \text{ cosine } \phi$$

In addition, the horizontal lift component L sine $\phi$ must equal the centripetal force which results in the expression:

$$L \text{ sine } \phi = mV_T\dot\psi$$

where $V_T = \dot\psi R$

Dividing the equation for the horizontal lift component by the equation for the vertical lift component and re-arranging the terms yields the equation $\dot\psi = g \tan \phi/V_T$. From FIG. 7 it is seen that for small pitch attitudes, the body axis yaw rate can be expressed as:

$$r = \dot\psi \cos \phi$$

which is the result of resolving the inertial heading rate into the yaw axis. Substituting the expression for $\dot\psi$ in terms of tan $\phi$ yields the expression:

$$r = g \text{ sine } \phi/V_T.$$

The output commanded yaw rate $r_{CMD}$ from the yaw rate command circuit 50 is applied to a first positive input terminal on a second algebraic summation circuit 51 and the aircraft yaw rate r received from a rate gyro 52 is applied to a negative input terminal on the algebraic summation circuit 51 which produces an error signal. This error signal $\delta_\psi$ is coupled through the appropriate amplifier 53 and is then applied to the aircraft directional control system through a basic autopilot system as indicated by the leader in FIG. 6. It should be noted that this basic autopilot system includes some integral control to eliminate static errors and compensate for aircraft trim changes.

Thus, the subject invention which provides for a constant relative heading angle $\beta$ and an instantaneous filtered signal $R_{blend}$, proportional to range, provides simple circuit means for processing data signals which enable an aircraft to fly a spiral path to a location marked by an omnidirectional radio beacon without first overflying the position of the beacon.

FIG. 8 is a block diagram of an aircraft control system 60 incorporating the subject invention and including flight path control in the vertical plane. A heading reference system 10 or 20 as shown in FIGS. 3 or 4, respectively, provides a heading reference signal $\psi_{REF}$ which is coupled to a heading command system 55 similar to that shown in FIG. 6 which provides a pair of output command signals $\delta_{\psi CMD}$ and $\phi_{CMD}$ which are coupled to an autopilot control system 61. A ranging circuit 28 produces a filtered range signal, $R_{blend}$, which is coupled to a deceleration command system 62 which may include a descent rate command system. The deceleration command system 62, which may be of the general type described in the present assignee's U.S. Pat. No. 3,096,503, and employed in a flight director system provides a thrust command signal $\delta T_{CMD}$ which is coupled to a thrust control system 63 to produce a thrust control signal $\delta_T$. This signal may control aircraft velocity by throttles. In addition, aircraft speed or velocity is further controlled via a pitch command signal $\delta\theta_{CMD}$ supplied from deceleration command system 62. The autopilot control system 61 produces the aircraft control signals $\delta_\psi$, $\delta_\phi$ and $\delta_\theta$ which are coupled to the yaw, roll and pitch control mechanisms for controlling the craft's flight path. The thrust and pitch commands are suitably blended to achieve the desired deceleration and hence velocity profile dependent upon aircraft types, configuration and airspeed regime. If the deceleration command system 62 includes a descent rate command, the thrust and pitch commands $\delta T_{CMD}$ and $\delta\theta_{CMD}$ are similarly blended and supplied to throttle system 63 and autopilot 61 to provide the desired let down rate or descent profile. It will be understood that other types of velocity and descent rate control devices may be employed, such as for example, vectored thrust systems, and drag systems. The autopilot control system 61 and the throttle control system 63 provide signals which guide the aircraft along a spiral flight path as a function of the constant desired heading signal $\beta_{DES}$ and the filtered range signal $R_{blend}$.

Figure 9:
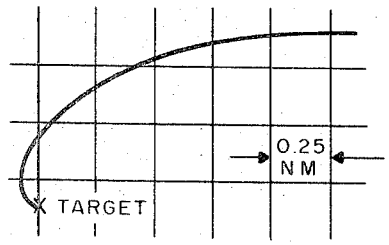
FIG. 9 is a graph of a left hand spiral flown by an aircraft having an initial velocity of 70 knots and an initial altitude of 1,000 feet.
Figure 10:
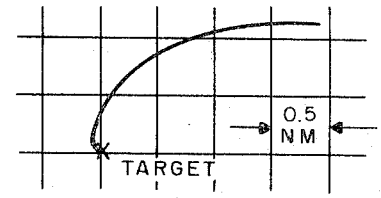
FIG. 10 is a graph of a spiral flown by an aircraft having an initial velocity of 120 knots and an initial altitude of 1,000 feet.
Figure 11:
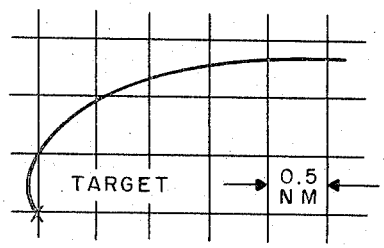
FIG. 11 is a graph of a spiral flown by an aircraft having an initial velocity of 150 knots and an initial altitude of 1,000 feet.
Figure 12:
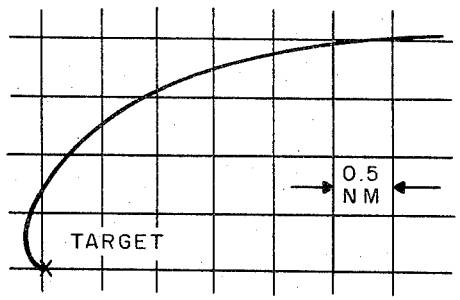
FIG. 12 is a graph of a spiral flown by an aircraft having an initial velocity of 170 knots and an initial altitude of 1,000 feet.
Figure 13:
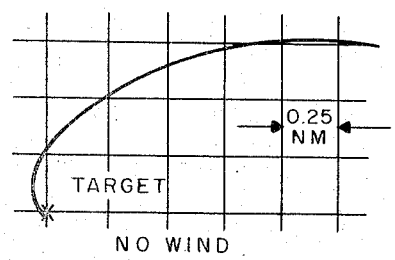
FIG. 13 is a graph of a spiral flown by an aircraft having an intial velocity of 120 knots with no wind.
Figure 14:
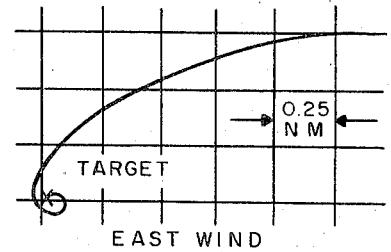
FIG. 14 is a graph of a spiral flown by an aircraft having an initial velocity of 120 knots in the presence of an east wind of 30 knots.
Figure 15:
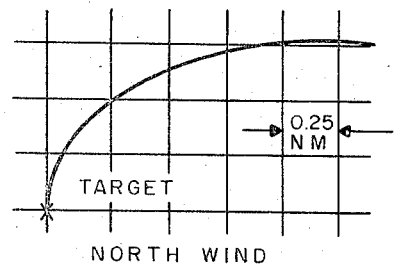
FIG. 15 is a graph of a spiral flown by an aircraft having an initial velocity of 120 knots in a north wind of 30 knots.
Figure 16:
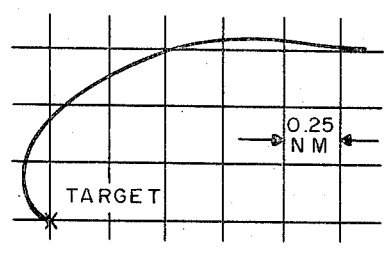
FIG. 16 is the graph of a spiral flown by an aircraft having an initial velocity of 120 knots in a west wind of 30 knots.
Figure 17:
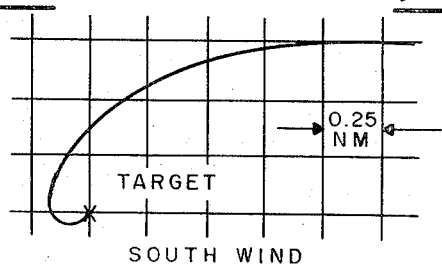
FIG. 17 is a graph of a spiral flown by an aircraft having an initial velocity of 120 knots in a south wind of 30 knots.

FIGS. 9, 10, 11 and 12 show the results obtained from an aircraft flying a left-hand spiral from an initial altitude of 1,000 feet at varying speeds. In FIG. 9 the initial speed of the aircraft was 70 knots. The initial range was 1.625 nautical miles and the lane defined by the straight-in path and the outer point of the spiral was 0.325 nautical miles, i.e., the maximum lateral displacement from the straight-in path is 0.325 nautical miles. In FIG. 10 the initial speed of the aircraft was 120 knots at a range of 2.25 nautical miles with a maximum lane width of 0.45 nautical miles. In FIG. 11 the initial speed of the aircraft was 150 knots at a range of 2.75 nautical miles and a maximum lane width of 0.575 nautical miles. In FIG. 12 the initial speed of the aircraft was 170 knots at a range of 4.0 nautical miles and a maximum lane width of 0.825 nautical miles. From these results it can be seen that the spiral path is longer than the straight-in approach. However, the need for overflying the target position is eliminated and the simplified circuitry more than offset the relatively small increase in path length.

FIGS. 13, 14, 15, 16 and 17 show the effect of 30 knot winds on the path traveled by an aircraft incorporating the described invention in approaching a target marked by an omnidirectional radio beacon.

While the invention has been described in its preferred embodiment, it is to be understood that the words which have been used are words of description rather than limitation and that changes may be made within the purview of the appended claims without departing from the true scope and spirit of the invention in its broader aspects. For example, by the term flight control systems as used herein, it will be understood that this term be considered in its broadest sense as including not only an auto-matic pilot but also a flight director system familiar to those skilled in aircraft control art.

We claim:

1. A flight control system for guiding an aircraft having a heading command system along a predetermined curved flight path to a position marked by a radio transmitter comprising relative bearing receiver means responsive to said radio transmitter output for providing a signal proportional to the bearing of said aircraft to said position, bias signal means which provides a signal proportional to a desired value of bearing between said aircraft and said position, direction sensing means for providing a signal proportional to the heading of said aircraft with respect to a specific reference direction, first summation means coupled to said receiver means and said bias signal means for providing a difference relative bearing signal, second summation means coupled to said first summation means and said direction sensing means for providing a heading output signal which is a function of said difference relative bearing signal, integrating means coupled to said first summation means for producing a leading relative bearing signal, third summation means coupled to said integrating means and said second summation means for providing an output heading reference signal, and means supplying said heading reference signal to said heading command system.

2. A flight control system for guiding an aircraft along said flight path as described in claim 1 wherein said bias signal means provides a signal proportional to a desired constant value whereby said predetermined curved flight path is a spiral flight path.

3. A flight control system for guiding an aircraft having a heading command system along a predetermined curved flight path to a position marked by a radio transmitter comprising absolute bearing receiver means responsive to said radio transmitter output for providing a signal proportional to the bearing of said aircraft to said position, bias signal means which provides a signal proportional to a desired value of bearing between said aircraft and said position, direction sensing means for providing a signal proportional to the heading of said aircraft with respect to a specific reference direction, first summation means coupled to said receiver means and said bias signal means for providing a signal proportional to the desired heading, second summation means coupled to said first summation means and said directional reference means, integrating means coupled to said second summation means for providing a leading heading signal, third summation means coupled to said first summation means and said integrating means for providing said heading reference signal, and means for supplying said heading reference signal to said heading command system.

4. A flight control system for guiding an aircraft along said flight path as described in claim 3 wherein said bias signal means provides a signal proportional to a desired constant value whereby said predetermined curved flight path is a spiral flight path.

5. A flight control system for guiding an aircraft along said flight path as described in claim 4 further including function generating means coupled to said second summation means for producing a first output signal in accordance with the sine of said relative bearing and a second output signal in accordance with the cosine of said relative bearing of said aircraft, velocity sensing means for providing a signal proportional to aircraft velocity, first multiplier means coupled to said function generating means and said velocity means for producing output signals that are the product of said sine of said relative bearing and a constant, and second multiplier means coupled to said function generating means and said velocity means for producing output signals that are the product of said cosine of said relative bearing and a constant.

6. A flight control system for guiding an aircraft along said flight path as described in claim 5 further including deriver means coupled to said receiver means for providing an output signal proportional to the rate of change of said relative bearing of said aircraft, divider means coupled to said first multiplier means and said deriver means for providing an output signal proportional to the ratio of said product signal to said relative bearing signal.

7. A flight control system for guiding an aircraft along said flight path as described in claim 6 further including algebraic summation means coupled to said divider means and said second multiplier means, and complementary filter means which includes an integrating circuit connected in feedback fashion to said algebraic summation circuit for providing an output signal proportional to the instantaneous value of range between said aircraft and said position.

* * * * *